(12) United States Patent
Lee et al.

(10) Patent No.: US 11,250,113 B2
(45) Date of Patent: Feb. 15, 2022

(54) FINGERPRINT IMAGE ACQUISITION APPARATUS AND METHOD FOR USER AUTHENTICATION

(71) Applicant: SUPREMA INC., Gyeonggi-do (KR)

(72) Inventors: Kideok Lee, Gyeonggi-do (KR); Hochul Shin, Gyeonggi-do (KR); Jong Man Lee, Gyeonggi-do (KR); Bong Seop Song, Gyeonggi-do (KR); Jae Won Lee, Gyeonggi-do (KR)

(73) Assignee: SUPREMA INC., Gyeonggi-Do (KR)

( * ) Notice: Subject to any disclaimer, the term of this patent is extended or adjusted under 35 U.S.C. 154(b) by 405 days.

(21) Appl. No.: 15/989,240

(22) Filed: May 25, 2018

(65) Prior Publication Data

US 2019/0205515 A1     Jul. 4, 2019

(30) Foreign Application Priority Data

Jan. 4, 2018   (KR) .......................... 10-2018-0001136

(51) Int. Cl.
*G06F 21/00* (2013.01)
*G06F 21/32* (2013.01)
(Continued)

(52) U.S. Cl.
CPC ............ *G06F 21/32* (2013.01); *G06F 3/0414* (2013.01); *G06F 21/82* (2013.01); *G06K 9/0004* (2013.01); *G06K 9/00087* (2013.01); *G08B 6/00* (2013.01)

(58) Field of Classification Search
CPC ........ G06F 21/32; G06F 21/82; G06F 3/0414; G06K 9/0004; G06K 9/00087; G06K 9/036; G06K 9/00013; G08B 6/00; G08B 5/36
See application file for complete search history.

(56) References Cited

U.S. PATENT DOCUMENTS

2015/0371073 A1* 12/2015 Cho .................. G06K 9/00013
                                                          382/124
2017/0108992 A1*  4/2017 Lee ...................... G06F 3/0418
(Continued)

FOREIGN PATENT DOCUMENTS

EP         3588454 A1 *  1/2020  .............. G07F 7/10
JP       2005-071210 A     3/2005
(Continued)

OTHER PUBLICATIONS

Zahid Syed; Jordan Helmick; Sean Banerjee; Bojan Cukic; "Effect of User Posture and Device Size on the Performance of Touch-Based Authentication Systems"; 2015 IEEE 16th International Symposium on High Assurance Systems Engineering; Year 2015 | Conference Paper | Publisher: IEEE; pp. 10-17 (Year: 2015).*

*Primary Examiner* — Shewaye Gelagay
*Assistant Examiner* — Courtney D Fields
(74) *Attorney, Agent, or Firm* — Bacon & Thomas, PLLC

(57) ABSTRACT

A fingerprint image acquisition method for user authentication is provided. The method comprises determining whether a sensed pressure, which is applied to a fingerprint input window by a finger of a user touching the fingerprint input window, exceeds a predetermined startup pressure, acquiring a comparison image by imaging a fingerprint of the finger when the sensed pressure exceeds the startup pressure, measuring a quality of the comparison image, determining a value of a threshold pressure based on the quality of the comparison image and acquiring an authentication image for the user by capturing an image of the fingerprint of the finger when the sensed pressure exceeds the threshold pressure.

13 Claims, 4 Drawing Sheets

(51) Int. Cl.
    *G06K 9/00*     (2022.01)
    *G08B 6/00*     (2006.01)
    *G06F 3/041*     (2006.01)
    *G06F 21/82*     (2013.01)

(56) References Cited

U.S. PATENT DOCUMENTS

2017/0124370 A1\*   5/2017   He .................... G06K 9/0002
2017/0293749 A1\*  10/2017   Baek .................. G06F 21/32
2018/0042127 A1\*   2/2018   Kim ................... G06F 3/0416

FOREIGN PATENT DOCUMENTS

JP       2005-135114 A     5/2005
KR   10-2016-0041432 A     4/2016

\* cited by examiner

FINGERPRINT IMAGE ACQUISITION APPARATUS AND METHOD FOR USER AUTHENTICATION

CROSS-REFERENCE TO RELATED APPLICATIONS

This application claims priority to Korean Patent Application No. 2018-0001136 filed on Jan. 4, 2018, the entire contents of which is incorporated herein by reference.

TECHNICAL FIELD

The present disclosure relates to a fingerprint image acquisition apparatus and method for acquiring a fingerprint image for user authentication from a user's finger in a higher quality.

BACKGROUND

As is well known, the importance of user authentication has become very high along with the development of information and communication technology. In recent years, various user authentication methods have been developed in addition to the classical authentication method using a code such as a password or the like.

In particular, the user authentication method using biometric information recognition is free from a risk of forgetting or losing and is characterized in that it is not only easy to use but also excellent in security. The authentication method using biometric information has been mainly used in an embedded system such as a personal computer (PC) or an automated teller machine (ATM). Recently, along with the development of technology, the use of the authentication method using biometric information is expanded even to mobile devices.

Among various types of biometric information, the fingerprint has the same form throughout the lifetime. Even if the fingerprint is hurt by external factors, it is soon reproduced in the original form. The probability of having a fingerprint of the same type as others is as low as one billionth. Due to such an advantage, there are many cases where a fingerprint among biometric information is adopted as an authentication means. The field of use of the fingerprint is also very diverse.

However, even in the authentication using the fingerprint, if the quality of a fingerprint image acquired from the finger of a user is not guaranteed over a certain level, authentication failure may occur. In particular, in the case of an in-display fingerprint sensor, which has recently become a subject of interest, it is difficult to obtain a high-quality image of a fingerprint in a state where the finger is insufficient in moisture (dry fingerprint). This may result in a decrease in authentication performance.

PRIOR ART DOCUMENT

Patent Document

Patent Document 1: Korean Patent Application Publication No. 10-2010-0002606 (published on Jan. 7, 2010)

SUMMARY

Embodiments of the present disclosure provide a fingerprint image acquisition apparatus and method capable of constantly acquiring a high-quality fingerprint image irrespective of a fingerprint state of a user to be authenticated.

It is to be understood, however, that the object of the present disclosure is not limited to the above-described one. Other objects not mentioned above will be clearly understood by those skilled in the art from the following description.

According to an embodiment of the present disclosure, by setting the fingerprint image capturing conditions differently according to the fingerprint state of the user to be authenticated, an optimal fingerprint image may always be acquired with a small amount of calculation regardless of the fingerprint state of the user. Particularly, it is possible to solve the problem caused by the low quality of the dry fingerprint image when using an in-display fingerprint sensor or the like. Accordingly, the probability of authentication failures for the user may be significantly reduced, and the reliability of a user authentication system may ultimately be enhanced.

DETAILED DESCRIPTION

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that the detailed description of related known components or functions unnecessarily obscures the gist of the present disclosure, the detailed description thereof will be omitted. Further, the terminologies to be described below are defined in consideration of the functions of the embodiments of the present disclosure and may vary depending on a user's or an operator's intention or practice. Accordingly, the definition thereof may be made on a basis of the content throughout the specification.

Figure 1:
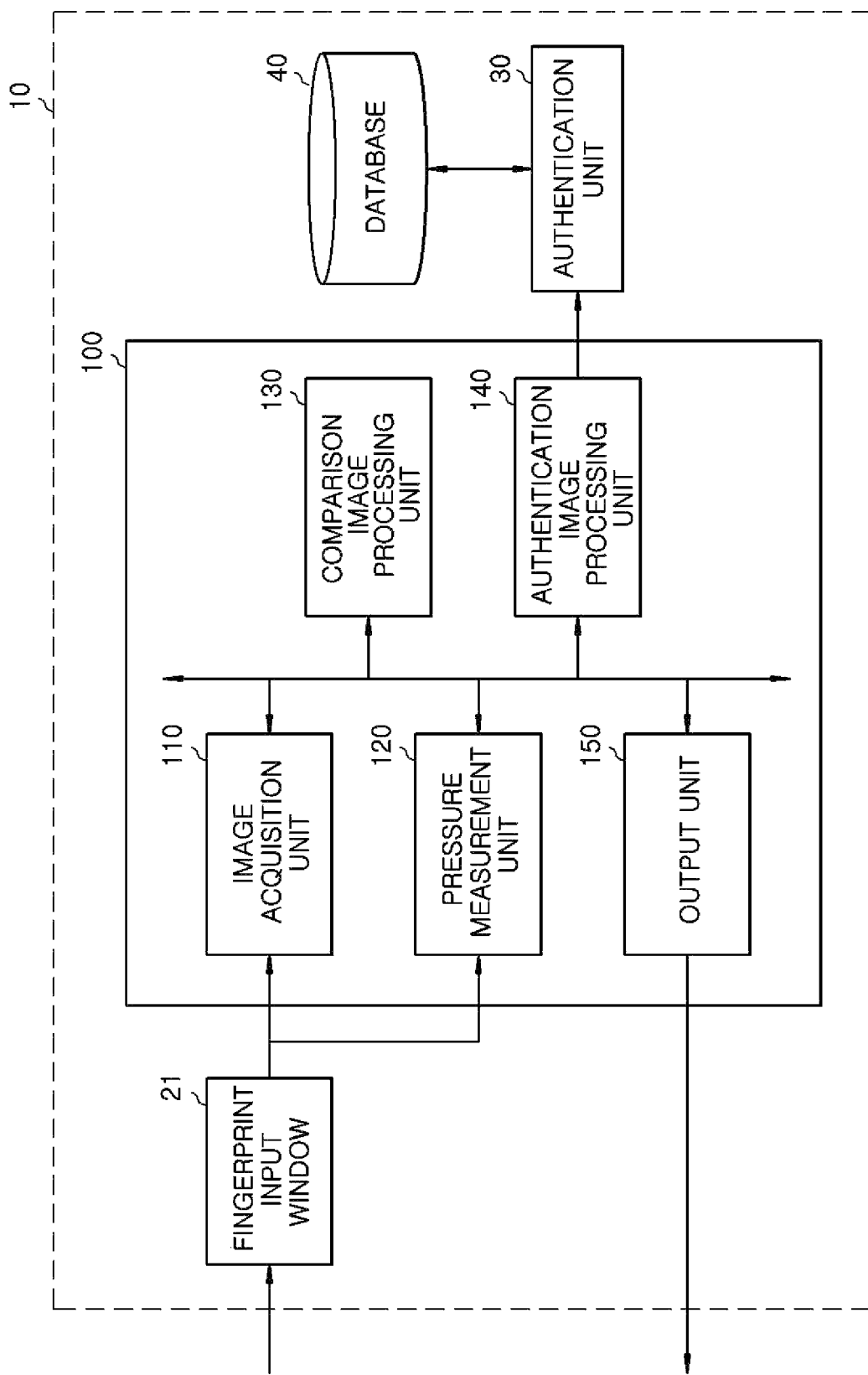
FIG. 1 is a view illustrating a configuration of a fingerprint image acquisition apparatus according to an embodiment of the present disclosure.

FIG. 1 is a view illustrating a configuration of a fingerprint image acquisition apparatus according to an embodiment of the present disclosure. The fingerprint image acquisition apparatus 100 shown in FIG. 1 is an apparatus for acquiring a fingerprint image used for a user authentication system 10 to authenticate a user from the finger of a user. Description will be made assuming that the user authentication system 10 shown in FIG. 1 is a mobile device to which an in-display fingerprint detection method can be applied. However, the present disclosure is not limited thereto.

The fingerprint image acquisition apparatus 100 may include an image acquisition unit 110, a pressure measurement unit 120, a comparison image processing unit 130, an authentication image processing unit 140, and an output unit 150. However, since the fingerprint image acquisition apparatus 100 shown in FIG. 1 is nothing more than an embodiment of the present disclosure, the technical idea of the present disclosure is not narrowly construed by FIG. 1.

The image acquisition unit 110 may acquire an image of a fingerprint by imaging a fingerprint of a finger of a user who makes contact with a fingerprint input window 21 provided in the user authentication system 10. In order to perform such a function, the image acquisition unit 110 may include an optical device for capturing an image of a fingerprint. The fingerprint input window 21 with which a fingerprint is brought into contact by a user is basically a separate element from the image acquisition unit 110. However, the fingerprint input window 21 may be integrated with the image acquisition unit 110.

Figure 2:
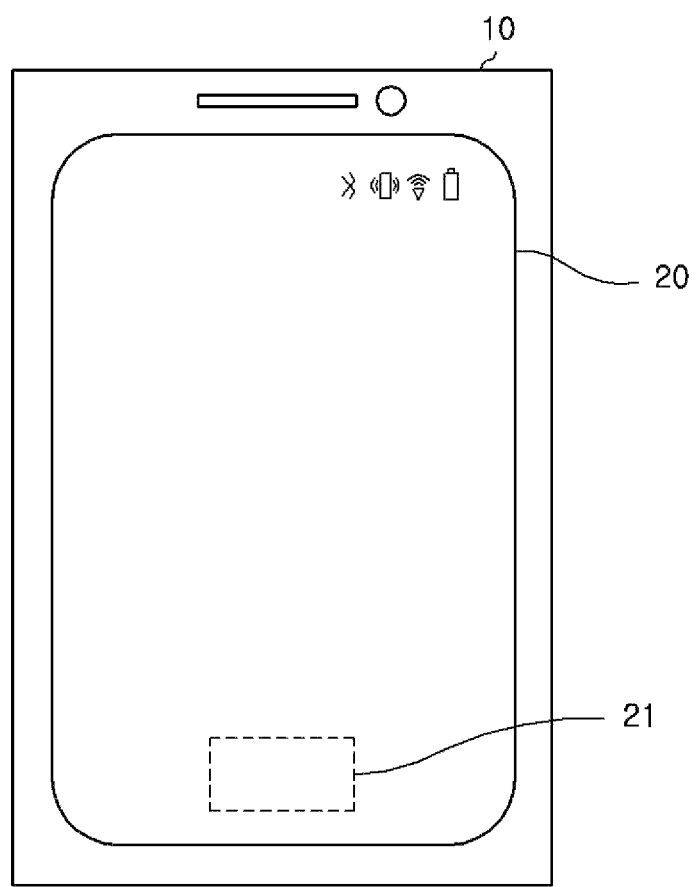
FIG. 2 is a view for explaining a mobile device to which the fingerprint image acquisition apparatus according to an embodiment of the present disclosure may be applied.

FIG. 2 is a view for explaining a mobile device to which the fingerprint image acquisition apparatus according to an embodiment of the present disclosure may be applied. In the example of FIG. 2, it is assumed that the user authentication system 10 is a smartphone that can be used only by a user authenticated through a fingerprint. In the case where an in-display fingerprint detection system is applied to the user authentication system 10, a partial region of a display 20 of the user authentication system 10 may be used as the fingerprint input window 21.

Hereinafter, description will be made by returning to FIG. 1. The pressure measurement unit 120 may measure the pressure applied to the fingerprint input window 21 by the user's finger in order to capture an image of a fingerprint, i.e., the magnitude of a sensed pressure, and may include a pressure sensor for that purpose. The pressure measurement unit 120 adopted in the embodiment of the present disclosure may be implemented through a so-called "force touch function" for measuring the strength of touch of a user.

When the sensed pressure measured by the pressure measurement unit 120 exceeds a predetermined startup pressure, the comparison image processing unit 130 may acquire a comparison image by allowing the image acquisition unit 110 to capture an image of a fingerprint of a finger of a user brought into contact with the fingerprint input window 21. Furthermore, the comparison image processing unit 130 may measure the quality of the comparison image and may determine a threshold pressure value based on the measured quality. That means, the threshold pressure value may vary depending on the quality of the comparison image. Details of the method of measuring the quality of the fingerprint image such as the comparison image or the like and the method of determining the threshold pressure value will be described later.

When the sensed pressure exceeds the threshold pressure determined by the comparison image processing unit 130, the authentication image processing unit 140 may acquire an authentication image by allowing the image acquisition unit 110 to capture an image of a fingerprint of a finger of a user brought into contact with the fingerprint input window 21. The acquired authentication image may be transmitted to an authentication unit 30 of the user authentication system 10. The authentication image processing unit 140 may be implemented by including an arithmetic processing device such as a microprocessor or the like. This holds true in the comparison image processing unit 130 described above or the authentication unit 30 to be described later.

The authentication unit 30 may determine whether to authenticate the user through the comparison between the authentication image transmitted from the authentication image processing unit 140 and the fingerprint image pre-stored in a database 40 of the user authentication system 10. The authentication unit 30 and the database 40 may be provided in the user authentication system 10 as components separate from the fingerprint image acquisition apparatus 100. Alternatively, the authentication unit 30 and the database 40 may be present as components included in the fingerprint image acquisition apparatus 100. That means, in this case, the fingerprint image acquisition apparatus 100 may perform not only the acquisition of the authentication image from the fingerprint but also the user authentication using the authentication image.

The database 40 may be specifically embodied as a computer readable recording medium. Examples of the computer readable recording medium may include magnetic media such as a hard disk, a floppy disk or a magnetic tape, optical media such as a CD-ROM or a DVD, a magneto-optical media such as a floptical disk or the like, and a hardware device such as a flash memory or the like specifically configured to store and execute program instructions.

When it is needed to inform the user of the occurrence of a specific event such as the completion of acquisition of the authentication image or the like, the output unit 150 may output a predetermined notification that can be recognized by a user through at least one of the user's five senses. Such a notification may be implemented in various forms such as a visual notification, a tactile notification, an auditory notification and the like. Accordingly, the output unit 150 may include various well-known types of output devices. In some cases, the output unit 150 may be implemented using an output device already provided in the user authentication system 10 (e.g., the display 20 shown in FIG. 2).

Figure 3:
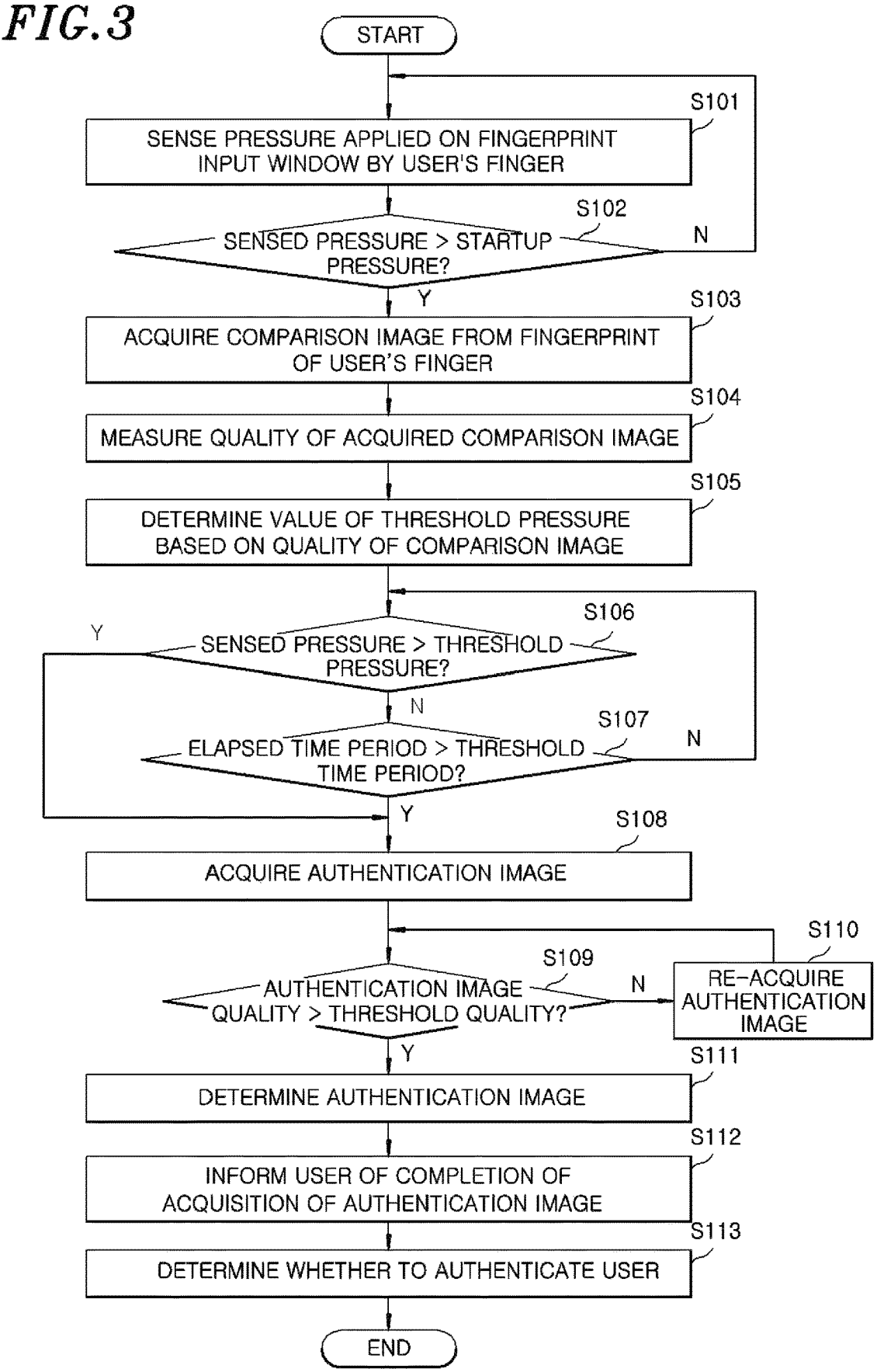
FIG. 3 is a flowchart illustrating the respective steps of the fingerprint image acquisition apparatus according to an embodiment of the present disclosure.

FIG. 3 is a flowchart illustrating the respective steps of the fingerprint image acquisition method according to an embodiment of the present disclosure. The fingerprint image acquisition method shown in FIG. 3 may be performed by the fingerprint image acquisition apparatus 100 described with reference to FIG. 1. Description of the parts overlapping with FIGS. 1 and 2 may be omitted. However, since the method shown in FIG. 3 is nothing more than an embodiment of the present disclosure, the concept of the present disclosure is not narrowly construed by FIG. 3. It goes without saying that the respective steps of the method shown in FIG. 3 may be performed in an order different from that shown in FIG. 3.

First, the pressure measurement unit 120 may sense the pressure applied on the fingerprint input window 21 by a user's finger touching the fingerprint input window 21 (S101). The pressure thus sensed may be referred to as a sensed pressure as described above. The pressure measurement unit 120 may continuously measure the sensed pressure. In practice, the pressure measurement unit 120 may repeatedly measure the sensed pressure at a predetermined time interval.

The comparison image processing unit 130 may determine whether the value of the sensed pressure continuously measured by the pressure measurement unit 120 exceeds a value of a startup pressure (S102). When the sensed pressure exceeds the startup pressure, the comparison image processing unit 130 may acquire a comparison image by allowing the image acquisition unit 110 to capture an image of a fingerprint of the user's finger making contact with the fingerprint input window 21 (S103).

Next, the comparison image processing unit 130 may measure the quality of the acquired comparison image (S104). Examples of the method of measuring the quality of the comparison image may include a method of measuring a difference in brightness between a ridge and a valley of the comparison image. That is, the method of measuring the quality of the comparison image is a method that makes use of the contrast of the comparison image. In the case of a low-quality comparison image, the difference in brightness between the ridge and the valley is not clear. Thus, it is difficult to distinguish the ridge and the valley. Accordingly, the comparison image processing unit 130 may determine that the quality of the comparison image is higher as the difference in brightness is larger.

As an alternative method, it may be possible to adopt a method of using a signal-to-noise ratio (SNR) of a comparison image. Assuming that the level of a noise is similar, the signal-to-noise ratio is generally proportional to the contrast described above. Therefore, the comparison image processing unit 130 may determine that the quality of the comparison image is higher as the signal-to-noise ratio value is larger.

Figure 4A:
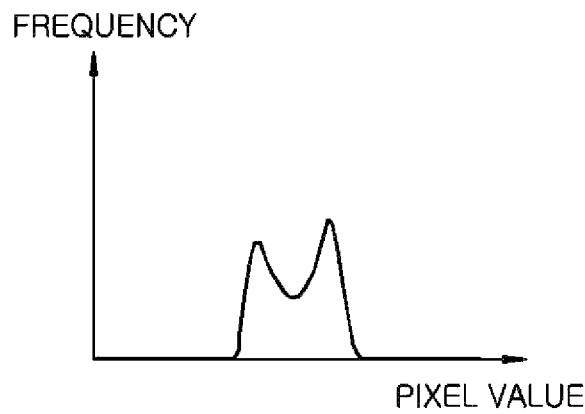
FIGS. 4A and 4B are views for explaining the measurement of a quality of a fingerprint image in the fingerprint image acquisition apparatus according to an embodiment of the present disclosure.
Figure 4B:
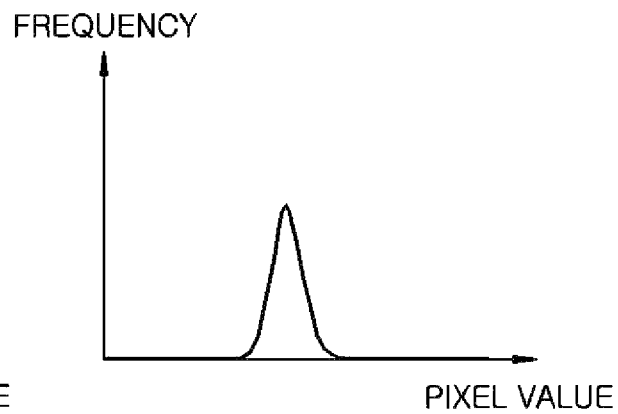

As another alternative method, it may be possible to use a method of utilizing a histogram of pixel values representing the brightness or color of each pixel of the comparison image. FIGS. 4A and 4B are views for explaining the method of utilizing a histogram. FIG. 4A shows a histogram of pixel values of a general fingerprint image, and FIG. 4B shows a histogram of pixel values of a fingerprint image having a low quality such as a dry fingerprint image or the like.

In the case of a general fingerprint image, the ridge and the valley are clearly distinguished due to the high contrast, and the pixel values are distributed over a relatively wide range. Thus, the histogram is likely to have a plurality of peaks as shown in FIG. 4A. On the other hand, in the case of a low-quality fingerprint image such as a dry fingerprint image or the like, the contrast is not high and the image is blurred. Therefore, the pixel values are distributed in a relatively narrow range, and the histogram is likely to have a bell shape with a single peak. In general, the comparison image processing unit 130 may determine the quality of the comparison image as a higher value as the variance of the pixel values in the comparison image is higher.

Upon completion of the quality measurement of the comparison image, the comparison image processing unit 130 may determine the value of a threshold pressure based on the quality of the comparison image (S105). As will be described in more detail below, the threshold pressure denotes the degree of pressure that the user has to apply to the fingerprint input window 21 in order to acquire an authentication image.

Actually, the authentication image used for user authentication is required to satisfy a certain level of quality in order to perform accurate authentication. However, as described above with reference to the example of the dry fingerprint, the quality of the fingerprint image may vary depending on the state of the finger of the user on which the fingerprint exists. In this case, it may be required that the image of the fingerprint of the user's be continuously captured until the fingerprint image having a quality equal to or higher than a predetermined level is acquired and that the quality of the fingerprint image acquired at each image capturing be measured. However, such a process is onerous and has a problem that the burden due to the quality measurement operation continues to occur.

In one embodiment of the present disclosure, the above problem may be solved by using the threshold pressure calculated through the use of the quality of the comparison image. Generally, in the case where it is difficult to obtain a high-quality image such as a dry fingerprint image or the like, a fingerprint image enabling authentication without problems can be obtained by making the finger pressed on the fingerprint input window 21 more strongly than in a general case.

Therefore, in the embodiment of the present disclosure, when the quality of the comparison image is low, the threshold pressure can be set high so that the finger of the user more strongly presses the fingerprint input window 21, thereby making it possible to acquire a high-quality authentication image regardless of the state of the finger. According to the method of setting the threshold pressure based on the quality of the comparison image as described above, it is possible to acquire a high-quality authentication image without measuring the quality of the fingerprint image several times. This makes it possible to reduce the calculation burden caused by the quality measurement. However, the embodiment of the present disclosure does not exclude the use, as an auxiliary means, of the quality measurement of the fingerprint image obtained in the time period during which the sensed pressure has not reached the threshold pressure as yet.

When the sensed pressure exceeds the threshold pressure (S106), the authentication image processing unit 140 may acquire an authentication image for user authentication by allowing the image acquisition unit 110 to capture an image of the user's finger touching the fingerprint input window 21 (S108). However, even if the sensed pressure does not exceed the threshold pressure, when the time period corresponding to a predetermined threshold time period elapses from the time when the sensed pressure exceeds the startup pressure (S107), the authentication image processing unit 140 may acquire an authentication image at that time. This is to prevent the time taken to acquire the authentication image from becoming excessively long.

Alternatively, even if the sensed pressure exceeds the threshold pressure, the authentication image processing unit 140 may determine whether the quality of the authentication image is equal to or higher than a predetermined threshold quality (S109). If the quality of the authentication image is lower than the threshold quality, the authentication image whose quality is equal to or higher than a threshold quality may be acquired again (S110). This is to more reliably ensure the quality of the authentication image.

According to this embodiment, when the sensed pressure exceeds the threshold pressure, the authentication image processing unit 140 may acquire a candidate authentication image by allowing the image acquisition unit 110 to capture an image of the fingerprint of the user's finger touching the fingerprint input window 21. If the quality of the initially acquired candidate authentication image satisfies a predetermined threshold quality, the authentication image processing unit 140 may determine the candidate authentication image as the authentication image.

In contrast, if the quality of the initially acquired candidate authentication image is lower than the predetermined threshold quality, the authentication image processor 140 may repeatedly acquire further candidate authentication images by allowing the image acquisition unit 110 to capture an image of the fingerprint of the finger. When an image satisfying the threshold quality appears among the further candidate authentication images, i.e., when the quality of the last image among the further candidate authentication images is equal to or higher than the threshold quality, the authentication image processing unit 140 may stop the acquisition of the further candidate authentication images and may determine the last image as the authentication image.

The authentication image processing unit 140 may repeat the acquisition of the further candidate authentication images according to a predetermined time interval or may repeat the acquisition of the further candidate authentication images each time when the sensed pressure increases by a predetermined increment. That is, if the time corresponding to the aforementioned time interval has elapsed from the acquisition of the last candidate authentication image, or if the value of the sensed pressure has increased by the increment as compared with the sensed pressure previously sensed at the time when the last candidate authentication image is acquired, the authentication image processing unit 140 may acquire the next candidate authentication image. Meanwhile, during the time period in which the sensed pressure is lower than the threshold pressure, the authentication image processing unit 140 may output guidance for guiding the user to more strongly press his or her finger on the fingerprint input window 21 through the output unit 150.

Hereinafter, another method of ensuring the quality of the authentication image will be described. As described above, when the elapsed time period from the time when the sensed pressure exceeds the startup pressure is within a threshold time period, the authentication image is acquired at the time when the sensed pressure exceeds the threshold pressure. However, when the elapsed time period is equal to or longer than the threshold time period, the authentication image may be acquired regardless of the sensed pressure as described above. In this case, however, there is a possibility that the pressure applied to the fingerprint input window 21 by the finger is insufficient so that the quality of the authentication image is not sufficiently secured.

Accordingly, the authentication image processing unit 140 may perform the quality measurement with respect to the authentication image acquired as the elapsed time period exceeds the threshold time period regardless of the sensed pressure. In this case, if the quality is equal to or higher than the threshold quality, the authentication image processing unit 140 may transmit the acquired authentication image to the authentication unit 30 just as it is. However, if the quality is lower than the threshold quality, the output unit 150 may output a warning notification that can be recognized by a user through at least one of the user's five senses. This warning notification may guide the user to apply a stronger pressure to the fingerprint input window 21. Thus, by such guidance, it becomes possible to acquire a new authentication image whose quality satisfies the threshold quality.

If the sensed pressure exceeds the threshold pressure between the first time at which the warning notification is outputted and the second time at which the threshold time period has elapsed from the first time (i.e., if the sensed pressure exceeds the threshold pressure during the threshold time period from the time when the warning notification is outputted), the authentication image acquisition unit 140 may acquire a new fingerprint image by imaging the fingerprint of the finger touching the fingerprint input window 21 and may replace the previously acquired authentication image with the newly acquired fingerprint image. That is, according to the present embodiment, when the user does not apply a sufficient pressure to the fingerprint input window 21 with his or her finger, a warning notification becomes periodically outputted to the user with a time interval whose length is equal to the threshold time period. This may enable the user's finger to press the fingerprint input window 21 with a pressure exceeding the threshold pressure. Ultimately, it is possible to secure a high-quality authentication image.

When the determination of the authentication image is completed through the process described above (S111), the output unit 150 may output a predetermined completion notification to inform the user that the acquisition of the authentication image is completed (S112). Such completion notification may be a vibration of the fingerprint input window 21, a visual change of the symbol being displayed on the fingerprint input window 21, or a combination of two or more types of completion notifications. Further, the authentication unit 30 may determine the authentication of the user using the authentication image (S113).

Figure 5A:
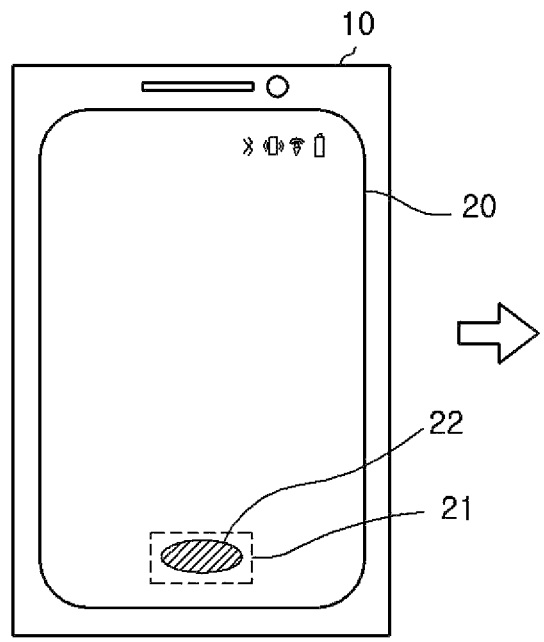
FIGS. 5A and 5B are views for explaining the completion notification visually outputted to a user in the fingerprint image acquisition apparatus according to an embodiment of the present disclosure.
Figure 5B:
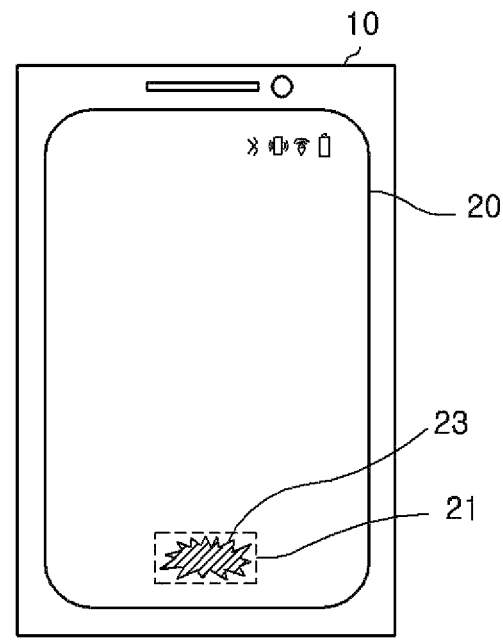

Hereinafter, the notification will be described in more detail with reference to FIGS. 5A and 5B. FIGS. 5A and 5B are views for explaining the completion notification visually outputted to the user in the fingerprint image acquisition method according to an embodiment of the present disclosure. Referring to FIG. 5A, it can be seen that an elliptical droplet symbol 22 is being displayed on the fingerprint input window 21 provided on the display 20 of the user authentication system 10. The droplet symbol 22 may indicate that the acquisition of the authentication image is not completed.

When the authentication image processing unit 140 completes the acquisition of the authentication image, the output unit 150 may display a broken droplet symbol 23 shown in FIG. 5B to the fingerprint input window 21 instead of the droplet symbol 22. Then, the user feels as if the droplet symbol 22 has turned into the broken droplet symbol 23. The user may know through such a change of the symbol that the acquisition of the authentication image is completed.

Furthermore, the output unit 150 may output the completion notification using the vibration through a so-called "taptic engine" in addition to the vibration of the classical method. Such a taptic engine may be utilized in conjunction with the above-described force touch function. The user may know through the vibration using the taptic engine that the acquisition of the authentication image is completed.

According to the embodiments of the present disclosure described so far, an optimal fingerprint image may always be obtained with a small amount of calculation regardless of the fingerprint state of the user. Particularly, it is possible to solve the problem caused by the low quality of the dry fingerprint image which may be attributable to the use of an in-display fingerprint sensor or the like. Accordingly, the probability of authentication failures for the user may be significantly reduced, and the reliability of a user authentication system may ultimately be enhanced.

The combinations of respective sequences of a flow diagram attached herein may be carried out by computer program instructions. Since the computer program instructions may be executed by processors of a general purpose computer, a special purpose computer, or other programmable data processing apparatus, the instructions, executed by the processor of the computer or other programmable data processing apparatus, create means for performing functions described in the respective sequences of the sequence diagram. The computer program instructions, in order to implement functions in a specific manner, may be stored in a memory useable or readable by the computer or a computer for other programmable data processing apparatus, and the instructions stored in the memory useable or readable by a computer may produce manufacturing items including an instruction means for performing functions described in the respective sequences of the sequence diagram. The computer program instructions may be loaded in a computer or other programmable data processing apparatus, and therefore, the instructions, which are a series of sequences executed in a computer or other programmable data processing apparatus to create processes executed by a computer to operate a computer or other programmable data processing apparatus, may provide operations for executing functions described in the respective sequences of the flow diagram.

Moreover, the respective sequences may refer to two or more modules, segments, or codes including at least one executable instruction for executing a specific logical function(s). In some alternative embodiments, it is noted that the functions described in the sequences may be run out of order. For example, two consecutive sequences may be substantially executed simultaneously or often in reverse order according to the corresponding functions.

The above description illustrates the technical idea of the present disclosure, and it will be understood by those skilled in the art to which this present disclosure belongs that various changes and modifications may be made without departing from the scope of the essential characteristics of the present disclosure. Therefore, the exemplary embodiments disclosed herein are not used to limit the technical idea of the present disclosure, but to explain the present disclosure, and the scope of the technical idea of the present disclosure is not limited by those embodiments. Therefore, the scope of protection of the present disclosure should be construed as defined in the following claims, and all technical ideas that fall within the technical idea of the present disclosure are intended to be embraced by the scope of the claims of the present disclosure.

What is claimed is:

1. A fingerprint image acquisition method for user authentication, comprising:
   recognizing a touching of a finger of a user on a fingerprint input window;
   sensing an input pressure of the touching of the finger;
   determining whether the input pressure exceeds a predetermined startup pressure;
   acquiring a comparison image by imaging a fingerprint of the finger when the input pressure exceeds the startup pressure;
   measuring a quality of the comparison image, wherein said measuring includes measuring the quality of the comparison image based on a difference in brightness between a ridge and a valley of the comparison image;
   determining a value of a threshold pressure based on the quality of the comparison image;
   acquiring an authentication image for the user by capturing an image of the fingerprint of the finger when the input pressure exceeds the threshold pressure, wherein the value of the threshold pressure is larger than the startup pressure and determined to be larger as the quality of the comparison image is lower, and said acquiring the authentication image includes acquiring the authentication image by imaging the fingerprint of the finger when an elapsed time period from the time when the input pressure exceeds the startup pressure, while not exceeding the threshold pressure, reaches a predetermined threshold time period;
   outputting a predetermined warning notification recognizable by the user when the quality of the authentication image is lower than a predetermined threshold quality;
   acquiring a further fingerprint image by imaging the fingerprint of the finger when the input pressure exceeds the threshold pressure during the threshold time period from the time when the warning notification is outputted; and
   replacing the authentication image with the further fingerprint image.

2. The method of claim 1, wherein said measuring further comprises measuring the quality of the comparison image based on a signal-to-noise ratio (SNR) of the comparison image and a variance of pixel values of the comparison image.

3. The method of claim 1, wherein said acquiring the authentication image further comprises:
   acquiring a candidate authentication image by imaging the fingerprint of the finger when the input pressure exceeds the threshold pressure;
   repeatedly performing an acquisition of a further candidate authentication image by imaging the fingerprint of the finger when a quality of the candidate authentication image is lower than a predetermined threshold quality; and
   stopping the acquisition of the further candidate authentication image and determining the further candidate authentication image as the authentication image when a quality of the further candidate authentication image is equal to or higher than the threshold quality.

4. The method of claim 3, wherein the acquisition of the further candidate authentication image is repeated in a predetermined time interval or repeated whenever the input pressure is increased by a predetermined increment.

5. The method of claim 1, further comprising:
   outputting a predetermined completion notification recognizable by the user when the authentication image has been acquired,
   wherein the completion notification includes at least one of a vibration of the fingerprint input window and a visual change of a symbol being displayed on the fingerprint input window.

6. The method of claim 1, further comprising:
   determining whether to authenticate the user through a comparison between the authentication image and a pre-stored fingerprint image.

7. A fingerprint image acquisition apparatus for user authentication, comprising:
   an image acquisition device configured to recognize a touching of a finger of a user on a fingerprint input window and acquire an image of a fingerprint of the finger of the user;
   a pressure sensor configured to sense and measure an input pressure, which is applied to the fingerprint input window by the finger;
   an output device configured to output a predetermined warning notification recognizable by the user when the quality of the authentication image is lower than a predetermined threshold quality; and
   a processor configured to, when the input pressure exceeds a predetermined startup pressure, acquire a comparison image by imaging the fingerprint of the finger through the image acquisition device, measure a quality of the comparison image, and determine a value of a threshold pressure based on the quality of the comparison image, when the input pressure exceeds the threshold pressure, acquire an authentication image for the user by imaging the fingerprint of the finger through the image acquisition device, wherein the processor determines the value of the threshold pressure to be larger than the startup pressure and to be larger as the quality of the comparison image becomes lower, wherein the processor performs measuring the quality of the comparison image based on a difference in brightness between a ridge and a valley of the comparison image, wherein said processor acquires the authentication image by imaging the fingerprint of the finger when an elapsed time period from the time when the input pressure exceeds the startup pressure, while not exceeding the threshold pressure, reaches a predetermined threshold time period, and wherein the processor acquires a further fingerprint image by imaging the fingerprint of the finger when the input pressure exceeds the threshold pressure during the threshold time period from the time when the warning notification is outputted, and replaces the authentication image with the new fingerprint image.

8. The apparatus of claim 7, wherein the measuring the quality of the comparison image includes measuring the quality of the comparison image based on a signal-to-noise ratio (SNR) of the comparison image and a variance of pixel values of the comparison image.

9. The apparatus of claim 7, wherein said processor acquires a candidate authentication image by imaging the fingerprint of the finger when the input pressure exceeds the threshold pressure, repeatedly performing an acquisition of a further candidate authentication image by imaging the fingerprint of the finger when a quality of the candidate authentication image is lower than a predetermined threshold quality, and stops the acquisition of the further candidate authentication image and determines the further candidate authentication image as the authentication image when a quality of the further candidate authentication image is equal to or higher than the threshold quality.

10. The apparatus of claim 9, wherein the processor repeats the acquisition of the further candidate authentication image in a predetermined time interval or repeats the acquisition of the further candidate authentication image whenever the input pressure is increased by a predetermined increment.

11. The apparatus of claim 7,
wherein the output device outputs a predetermined completion notification recognizable by the user when the authentication image has been acquired,
wherein the completion notification includes at least one of a vibration of the fingerprint input window and a visual change of a symbol being displayed on the fingerprint input window.

12. The apparatus of claim 7, further comprising:
an authentication unit configured to determine whether to authenticate the user through a comparison between the authentication image and a pre-stored fingerprint image.

13. A non-transitory computer-readable storage medium including computer-executable instructions, wherein the instructions, when executed by a processor, cause the processor to perform a method for a fingerprint image acquisition, the method comprising:

recognizing a touching of a finger of a user on a fingerprint input window;

sensing an input pressure of the touching of the finger;

determining whether the input pressure exceeds a predetermined startup pressure;

acquiring a comparison image by imaging a fingerprint of the finger when the input pressure exceeds the startup pressure;

measuring a quality of the comparison image based on a difference in brightness between a ridge and a valley of the comparison image;

determining a value of a threshold pressure based on the quality of the comparison image;

acquiring an authentication image for the user by capturing an image of the fingerprint of the finger when the input pressure exceeds the threshold pressure, wherein the value of the threshold pressure is larger than the startup pressure and determined to be larger as the quality of the comparison image is lower, and said acquiring the authentication image includes acquiring the authentication image by imaging the fingerprint of the finger when an elapsed time period from the time when the input pressure exceeds the startup pressure, while not exceeding the threshold pressure, reaches a predetermined threshold time period;

outputting a predetermined warning notification recognizable by the user when the quality of the authentication image is lower than a predetermined threshold quality;

acquiring a further fingerprint image by imaging the fingerprint of the finger when the input pressure exceeds the threshold pressure during the threshold time period from the time when the warning notification is outputted; and replacing the authentication image with the further fingerprint image.

* * * * *